United States Patent
Loredo, Jr. et al.

(10) Patent No.: US 9,559,775 B2
(45) Date of Patent: Jan. 31, 2017

(54) METHOD AND APPARATUS FOR PROVIDING OPTICAL NETWORKING USING A PLUGGABLE HIGH-SPEED INTERFACE

(71) Applicants: Vincent P. Loredo, Jr., Richardson, TX (US); Leslie Robert Murray, The Colony, TX (US)

(72) Inventors: Vincent P. Loredo, Jr., Richardson, TX (US); Leslie Robert Murray, The Colony, TX (US)

(73) Assignee: Tellabs Operations, Inc., Naperville, IL (US)

( * ) Notice: Subject to any disclaimer, the term of this patent is extended or adjusted under 35 U.S.C. 154(b) by 482 days.

(21) Appl. No.: 13/967,759

(22) Filed: Aug. 15, 2013

(65) Prior Publication Data

US 2015/0050022 A1   Feb. 19, 2015

(51) Int. Cl.
| | |
|---|---|
| *H04J 14/00* | (2006.01) |
| *H04B 10/25* | (2013.01) |
| *H04L 12/40* | (2006.01) |
| *H04L 12/64* | (2006.01) |

(52) U.S. Cl.
CPC ........... *H04B 10/2503* (2013.01); *H04L 12/40* (2013.01); *H04L 12/6418* (2013.01)

(58) Field of Classification Search
CPC ................ H04B 10/40; H04B 10/2503; H04B 10/25753; H04B 1/25758; H04J 14/0239; H04J 14/0245; H04J 14/0246; H04J 14/0249; H04J 14/0278; H04J 14/0235
USPC ........ 398/66, 67, 68, 69, 70, 71, 72, 98, 99, 398/100, 135, 136, 33, 38, 164; 370/352, 370/392, 389, 468, 465, 401
See application file for complete search history.

(56) References Cited

U.S. PATENT DOCUMENTS

| | | | |
|---|---|---|---|
| 7,693,178 B2 * | 4/2010 | Wojtowicz | H04B 10/40 370/249 |
| 7,957,650 B2 * | 6/2011 | Pan | H04B 10/40 398/135 |
| 8,938,166 B2 * | 1/2015 | Roullot | H04B 10/40 398/135 |
| 2012/0177375 A1 * | 7/2012 | Wang | G02B 6/3817 398/115 |

(Continued)

OTHER PUBLICATIONS http://www.lyconsys.com/index.php/de/produkte/usb-netzwerkadapter. "USB-SFB-NETZWERLADAPTER". LyconSys Gmbh & Co.KG. 2006-2013.

(Continued)

*Primary Examiner* — Hanh Phan
(74) *Attorney, Agent, or Firm* — James M. Wu; JW Law Group

(57) ABSTRACT

One embodiment of the present invention illustrates a high-speed PON converter ("HPC") configured to be a pluggable high-speed PON conversion device used for coupling a user equipment ("UE") to an optical network. HPC, in embodiment, includes a passive optical network ("PON") interface, a high-speed electrical ("HSE") interface, and a conversion component. The PON interface, which is coupled to an optical network via an optical fiber, is able to receive optical information from the optical fiber. The HSE interface is configured to be pluggable to the UE, such as a personal computer ("PC"), laptop, or tablet via a predefined removable connector. The conversion component converts and transmits signals between the HSE and PON interfaces.

17 Claims, 8 Drawing Sheets

(56) References Cited

U.S. PATENT DOCUMENTS

| | | | | |
|---|---|---|---|---|
| 2012/0275784 A1* | 11/2012 | Soto | ............ | H04B 10/2503 |
| | | | | 398/38 |
| 2013/0198796 A1* | 8/2013 | Brooks | ............ | H04L 12/2898 |
| | | | | 725/129 |
| 2013/0283196 A1* | 10/2013 | Farnan | ............ | G06F 19/3468 |
| | | | | 715/771 |

OTHER PUBLICATIONS http://store.apple.com/us/product/MD463ZM/A/thunderbolt-to-gigabit-ethernet-adapter. "Thunderbolt to Gigabit Ethernet Adapter". Apple Inc. 2013.

* cited by examiner

METHOD AND APPARATUS FOR PROVIDING OPTICAL NETWORKING USING A PLUGGABLE HIGH-SPEED INTERFACE

FIELD

The exemplary embodiment(s) of the present invention relates to telecommunications network. More specifically, the exemplary embodiment(s) of the present invention relates to optical networking using a high-speed portable interface.

BACKGROUND

With increasing demand for more information to be supplied to homes and/or businesses, many network communication providers are switching or upgrading their networks to optical communications network. Optical communications networks typically offer high-speed voice, video, and data transmission to/from homes and/or businesses. Conventional exemplary optical networks include fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends.

To transmit optical signals from a source to a destination over a Passive Optical Network ("PON"), for example, the optical signals typically travel through multiple passive optical components such as fiber cables, optical splitters and attenuators that make up the optical distribution network ("ODN"). In one example, ODN and PON are the same or similar component and they can be described fiber network between an optical line terminal ("OLT") and optical network terminals ("ONTs"). PON typically can be considered as a specific type of ODN.

OLT and ONTs, for example, convert user data between electrical form and optical form to facilitate the user data to travel over the ODN. PON is referred for residential as well as commercial use. Similar PON technology used for enterprise LAN solutions is generally known as Optical LAN. PON is capable of serving multiple points or premises based on a single optical fiber. For example, PON may be able to individually distribute information from one optical fiber to multiple locations. A typical PON may be able to serve anywhere from one (1) to 128 locations and/or nodes.

To process optical information, optical data (or signals) typically needs to be converted to electrical data before the information can be processed. Conventional optical and electrical conversion in a PON uses either a large MDU (multi dwelling units) with up to 24 Ethernet output ports installed in a telecommunication closet or a sizable conventional ONT (PON interface) with one to four Ethernet ports placed near user's personal computer ("PC") and/or vicinities. A problem, however, associated with a large MDU is that it requires relatively long cables to reach the end user. Depending on the applications, long cables such as copper or coaxial cables can impair quality of connection and degrade network performance.

Another drawback associated with a sizable or large size of conventional ONT device is that it can consume additional power. As a result, a dedicated power supply may be employed for such conventional ONT devices. Another shortcoming for conventional ONTs is that their Ethernet ports are limited to 1 Gigabit data rates.

SUMMARY

One embodiment of the present invention illustrates a passive optical network ("PON") interface, a high-speed electrical ("HSE") interface, and a conversion component. The PON interface, which is coupled to an optical network via an optical fiber, is able to transmit and receive optical information to and from the optical fiber. The HSE interface is configured to be pluggable to the UE, such as a personal computer ("PC"), laptop, or Tablet via a predefined removable connector. The PON component converts the optical signals to electrical signals to be forwarded to the HSE interface by the conversion component. The conversion component also passes signals to the PON interface according to the electrical data received from the HSE interface.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
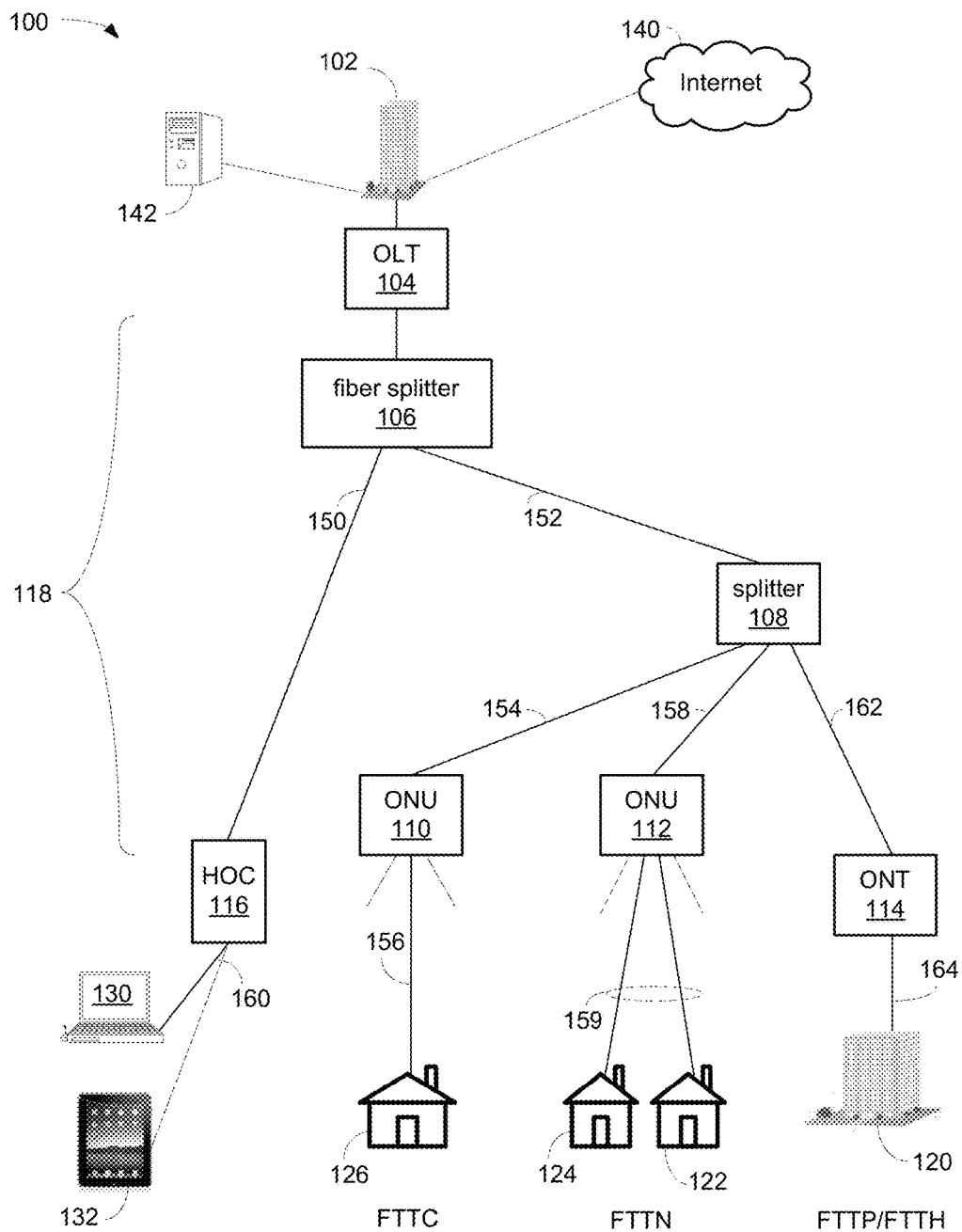
FIG. 1 is a block diagram illustrating a network layout including optical networks and HPC in accordance with one embodiment of the present invention.

Exemplary embodiment(s) of the present invention describe here in the context of a method and/or apparatus for simplifying access to an optical network using a pluggable high-speed PON converter.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present application discloses a high-speed PON converter ("HPC") which is a pluggable high-speed PON conversion device used for coupling between a user equipment ("UE") to an optical network. HPC includes a passive optical network ("PON") interface, a high-speed electrical ("HSE") interface, and a conversion component. The PON interface, which is coupled to an optical network via an optical fiber, is able to communicate with the optical network via fibers. The HSE interface, on the other hand, is configured to be pluggable to UE, such as a personal computer ("PC"), laptop, or tablet PC via a predefined removable connector and is able to communicate with UE via electrical signals. The conversion component converts information in electrical between the HSE and PON interfaces. For example, the HSE component uses one data format, and the PON component may use a different data format even though both have electrical interfaces to the converter. Alternatively, the information may be passed in native form between the HSE and PON components.

FIG. 1 is a block diagram 100 illustrating a network layout including optical networks and HPC in accordance with one embodiment of the present invention. Diagram 100 includes a central office ("CO") 102, an OLT 104, a building 120, neighborhood 122-124, a premise 126, UEs 128. UEs 128, in one example, include one or more of personal devices such as laptop computer 130 and tablet 132. It should be noted that the underlying concept of the exemplary embodiment(s) of the present invention would not change if one or more blocks (or elements or connections) were added to or removed from diagram 100.

To provide optical networking communication, an exemplary PON layout 118 is used. For example, FTTC is used to couple OLT 104 to premise 126 such as a house or home via a network path including fiber splitter 106, splitter 108, ONU 110, and connections 152-156. FTTN may be used to connect OLT 104 to neighborhood 122-124 via a network path including fiber splitters 106-108, ONU 112, and connections 152 and 158-159. Also, FTTP or FTTH may be used to connect OLT 104 to building 120 via a network path including fiber splitters 106-108, ONT 114, and connections 152 and 162-164. In one embodiment, HPC 116 is used to connect OLT 104 to UE 128 via a path including splitter 106 and connections 150 and 160. It should be noted that splitter 106 and 108 can be combined into one single unit.

CO 102, in addition to couple to OLT 104, also coupled to server 142 and Internet 140. CO 102 is a network management system capable of maintaining and monitoring communications that it controls. For example, CO 102 provides functions for controlling, planning, allocating, deploying, coordinating, and monitoring the resources of a network, including performing functions, such as fault management, configuration management, accounting management, performance management, and security management ("FCAPS"). The fault management is able to identify, correct and store faults that occur in an optical network. The configuration management identifies, simplifies, and tracks the network configuration and the accounting management identifies and collects usage statistics for the customers or users. The performance management determines the efficiency of the current network, such as throughput, percentage utilization, error rates and response time. It should be noted that performance thresholds can trigger alarms and alerts. Security management maintains a process of controlling access to the network.

Server 142 can be a database, a service provider, and/or a cluster of network devices capable of accessing the optical network. Internet 140 is a world-wide computer network that includes many private, public, business, government, academic, and personal networks interconnected by electronic, wireless, terrestrial, and optical networks. Note that server 142 optionally provides services to various UEs.

OLT 104, for example, supports a group of PONs 118, wherein each PON is able to support one or more ODNs. Each ODN, in one example, provides optical data transmission between one (1) OLT and a group of ONTs. Depending on the applications, a PON may support 1 to 64 ONTs. ONT 114, as shown in FIG. 1, may be physically situated at customer's premise 120, wherein premise 120 further includes various local communication devices (or equipments) such as UEs, voice device, and/or servers. A function of ONT is to convert signal format between optical signals and electrical signals. For instance, ONT 114 receives optical signals from a corresponding splitter 108 and subsequently converts the optical signals to electrical signals before the electrical signals are being transmitted to devices in building 120. Similarly, ONT 114 receives electrical signals from local devices in building 120, and then converts the electrical signals to optical signals before being transmitted to OLT 102 via splitters 106-108. In one aspect, CO 102 manages multiple OLTs.

A function of ONU 110 or 112 is to convert signal format between optical signals and electrical signals, and splits one fiber into multiple electrical connections. For instance, ONU 112 receives optical signals from a corresponding splitter 108 and subsequently converts the optical signals to electrical signals before the electrical signals are being transmitted to premise 122 or 124 or both. Similarly, ONT 112 receives electrical signals from both premises 122 and 124, and then converts the electrical signals to optical signals and combines both electrical signals into one optical transmission before being transmitted to OLT 102 via splitters 106-108.

HPC 116, in one embodiment, is a pluggable fiber broadband to high-speed interface converter. A function of HPC 116, which is considered as a pluggable media converter, is to establish a connection between a fiber optic PON network and an end user's PC or UE via a high-speed electrical interface. An exemplary high-speed electrical interface is USB 3.0, Thunderbolt™, Peripheral Component Interconnect Express™ ("PCIe") connection interface, or the like. Such high-speed electrical interface generally provides and/or supports sufficient bandwidth to match the optical capacity. It should be noted that the connector, which is used to plug to a PC, can be a standardized interface that is capable of supporting detaching activities. The high speed electrical interface also provides an electrical path to power the broadband fiber interface.

The optical interface, for example, is a PON connection that can be fit into a relatively small form factor ("SFF"). The PON interface may be made up of an optical to electrical interface, a PON Media Access Controller, and a network controller. In one embodiment, HPC 116 includes a converter socket capable of housing a PON module. The converter socket and broadband module, in one aspect, are powered by the user's PC or UE after HPC 116 is coupled to the PC.

HPC 116, in one embodiment, is configured as an electrical converter module having a socket in which an optical PON module can be installed or inserted. Note that the socket may contain a standardized interface whereby various different types of PON modules can be inserted.

Alternatively, HPC 116 can be formed or fabricated as a PON module containing a high-speed PC interface. For instance, a 10-Gigabit-capable Passive Optical Network ("XG-PON") module contains a Thunderbolt™ or USB 3.0 interface. It should be noted that HPC 116, in one example, also provides a low speed control/status path to the broadband module.

For an alternative embodiment, a PON module socket is integrated into the PC. For instance, PCIe interface to 40GPON Module is integrated into user's PC. It should be noted that HPC 116 also provides a low speed control and status path to the broadband module as well as power management. For example, HPC 116 includes a power converter to convert the PC or UE supply voltage to the voltage required by the PON interface.

An advantage of using HPC 116 is that it simplifies network connection between a UE and an optical network. Another advantage of using HPC 116 is that it draws power from the connected UE whereby additional power supply for HPC 116 is not needed.

Figure 2:
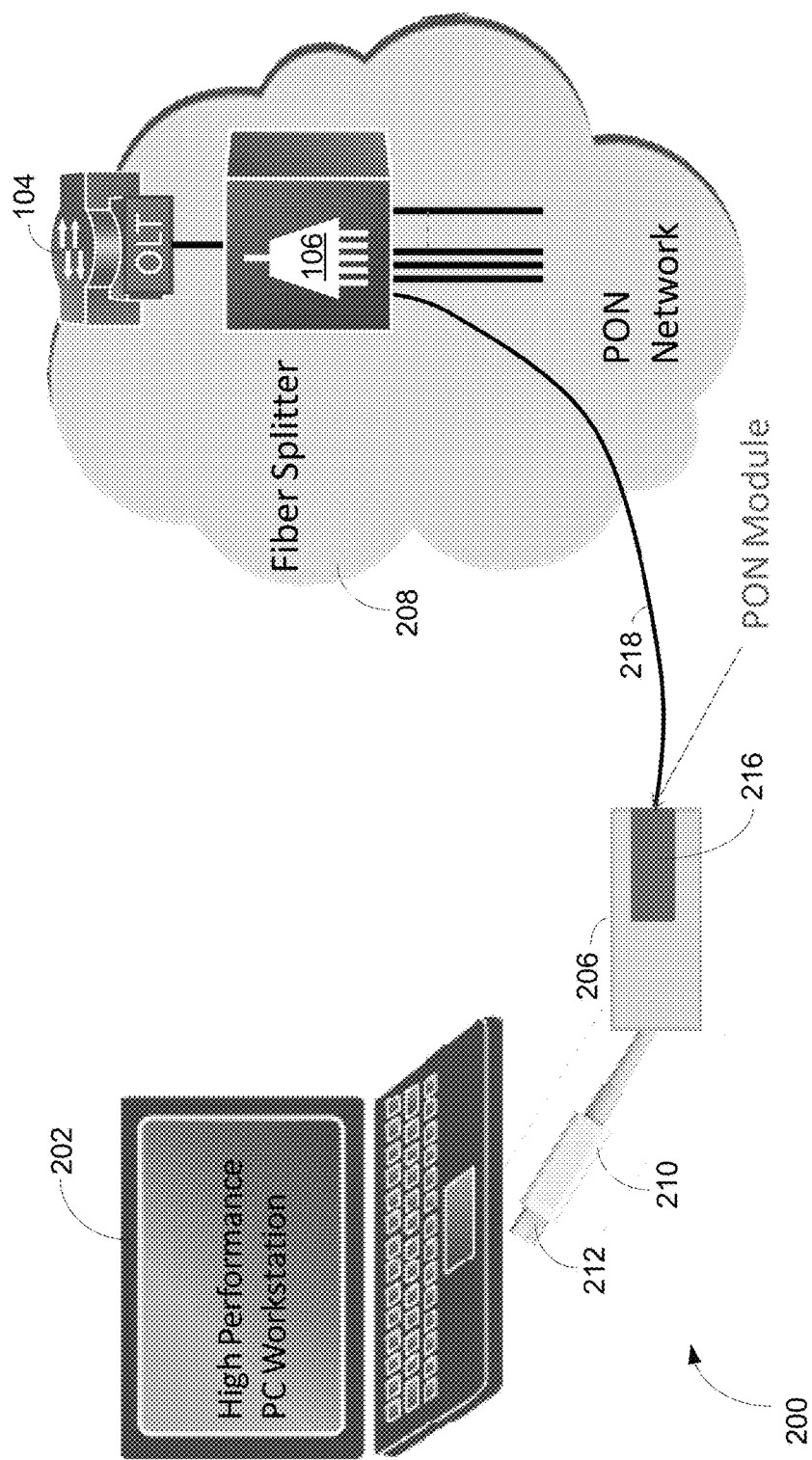
FIG. 2 is a block diagram illustrating simplified optical network connections using a high-speed PON converter ("HPC") in accordance with one embodiment of the present invention.

FIG. 2 is a block diagram 200 illustrating a simplified optical network connection using HPC in accordance with one embodiment of the present invention. Diagram 200 includes a PC or UE 202, HPC 206, and PON network 208 wherein PON network 208 includes OLT 104 and splitter 106. HPC 206, in one embodiment, includes an electrical cable 210 and an optical fiber 218. While electrical cable 210 is used to couple to PC 202, optical fiber 218 is coupled to PON network 208. It should be noted that the underlying concept of the exemplary embodiment(s) of the present invention would not change if one or more blocks (or elements or connections) were added to or removed from diagram 200.

PC 202, in one example, can be any types of UE(s), such as a laptop computer, desktop computer, server, workstation, tablet, smart phone, portable game console, and the like. To access an optical network, PC 202 includes a high-speed electrical ("HSE") interface having one or more HSE ports. For example, an HSE interface may be a Thunderbolt™ compatible interface or a USB 3.0 interface with standard coupling mechanism. It should be noted that PC 202 should be able to process information based on electrical signals received from the HSE port.

In an alternative example, PC 202 can be a network device such as a router and/or switch capable of connecting to a point-to-multipoint PON network via HPC 206. In operation, HPC 206, upon connection, draws power from the connected PC 202 or router, is able to facilitate communication between PC 202 and the PON network. To support wireless devices, HPC 206, which can be a WiFi router, distributes data or packet stream between the PON network and connected devices including wireless devices such as handled devices.

PON network 208, in one example, is a broadband and/or multi-service access technology that allows optic transmission cables or fibers to reach UEs. A PON network layout is capable of bringing optical fiber and optical signals to the end user. Depending on where the PON terminates, the layout can be described as FTTC, FTTB, FTTH, and/or FTTN. In one aspect, a PON includes one or more OLTs at CO and multiple ONUs near end users. For example, up to 128 ONUs may be supported by one (1) OLT. PON network 208, in one example, is a point-to-multipoint and fiber to multiple premises network for transmitting information.

HPC 206, similar to HPC 116 shown in FIG. 1, is an interface converter ("IC") device having a high-speed detachable interface cable 210 and PON interface 216. The high-speed detachable interface 210 is removably plugged into an HSE port at an UE. Optical fiber 218 is detachably coupled to fiber splitter 106. HPC 206 (or IC device) is able to facilitate communication between PON network 208 and PC or UE 202.

In one embodiment, HPC 206 supports hot plugging, hot connection, or hot disconnection. Hot plugging, also known as hot swapping, is a function of connecting and/or disconnecting to a digital system without shutting down the system. For example, connector 212 of HPC 206 can be plugged into HSE port of UE 202 while UE 202 is running. Similarly, unplugging optical fiber 218 from HPC 206 will generate minimal interruptions to UE 202 and splitter 106.

HPC 206, in one embodiment, is able to obtain or draw power from PC 202 via the high-speed detachable interface cable 210 when it is plugged into the HSE port. HPC 206 further includes a PON interface, HSE interface, and conversion component. While the PON interface is able to receive optical information from optical fiber 218, the HSE interface is able to forward electrical data to PC 202 when it is plugged to a port via a predefined removable connector 212, such as a Thunderbolt™ compatible plug or connector. The conversion component is able to convert signal format between PON and electrical interfaces, and transmits the information between the HSE interface and the PON interface.

An advantage of employing HPC 206 is that it provides a solution of receiving power from user's PC 202 whereby external power supply to HPC 206 may not be required. Another advantage of using HPC 206 is that it places optical fiber fairly close to PC 202 whereby the usage of cables or copper cables is reduced. Reduction in cable usage will reduce signal loss whereby it can increase transmission distance. For example, using HPC 206 may increase signal transmission distance between user and network switch from 0.1 kilometers ("km") to approximately 40 km.

Another advantage of using HPC 206 is that it saves space. For example, although the dongle shaped HPC 206 still require space, it is only a fraction of the size of a conventional converter box. It should be noted that since HPC 206 uses standard high-speed PC interface such as Thunderbolt (10 Gbps), it is no longer limited by the standard Gigabit PC network connector.

Figure 3:
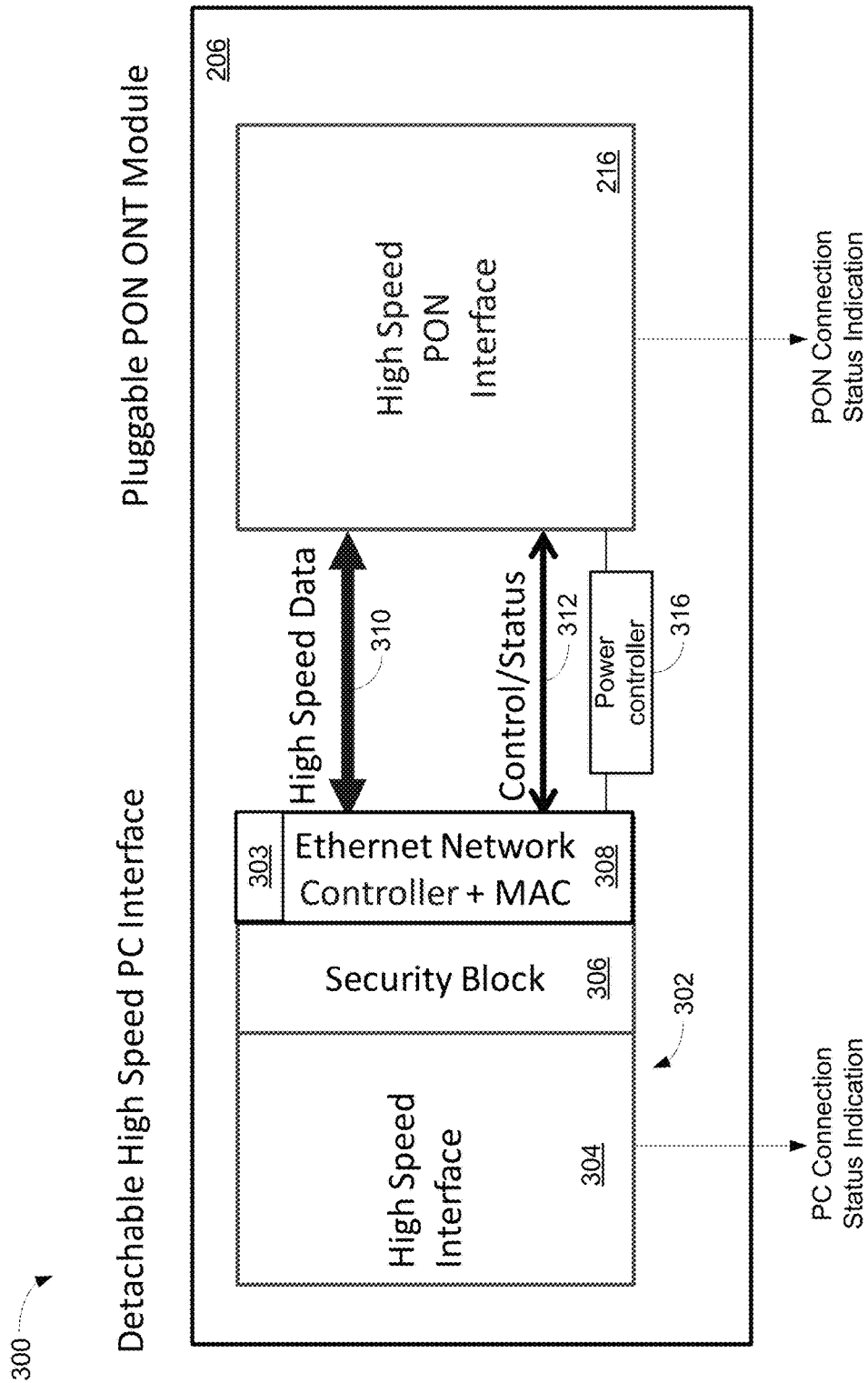
FIG. 3 is a block diagram illustrating components in a high-speed PON converter in accordance with one embodiment of the present invention.

FIG. 3 is a block diagram 300 illustrating components in HPC 206 in accordance with one embodiment of the present invention. Diagram 300 includes a PON interface 216, HSE interface 304, conversion component 303, and internal connections. Internal connections, in one embodiment, include a high-speed data bus 310, control/status bus 312, and power controller 316. It should be noted that the underlying concept of the exemplary embodiment(s) of the present invention would not change if one or more blocks (or elements or connections) were added to or removed from diagram 300.

PON interface 216 is able to receive optical information from an optical fiber which is connected to an optical network or point-to-multipoint PON network. HPC 206 includes an optical module socket configured to house a PON module. PON module 216 transmits optical signals to the PON network as well as receives optical signals from the PON network. In one aspect, PON module is a high performance module facilitating fiber or optical communication in a point-to-multipoint network. The fiber communication may use a burst mode transmitter and/or continuous receiver with different data rate and wavelengths. Note that PON module can be one of GPON, XGPON, EPON, WDM PON, and 10G GEPON optical formats modules.

HSE interface 302, in one embodiment, includes a high-speed PC interface 304, security block 306, and Ethernet network controller 308. PC interface 304 is coupled to PON interface 216 via internal connections, and configured to be pluggable to a UE HSE port(s) via a predefined removable connector. For example, HSE interface 304 is able to implement Thunderbolt™ connectivity and able to communicate with UE via a pluggable Thunderbolt™ cable connector. Alternatively, HSE interface 304 is able to implement Universal Serial Bus ("USB") 3.0 protocol and able to communicate with UE via a pluggable USB 3.0 cable connector.

To provide viewable status, HSE interface 302 is configured to provide status to indicate PC connection status. Similarly, PON interface 216 can also be configured to provide PON connection status. It should be noted that the signals provided by HSE interface 302 and PON interface 216 are fed to status indicator driver or component thereby real-time status indictors are provided.

Ethernet network controller 308, in one example, manages communication between high-speed PC interface 304 and high-speed PON interface 216 via high-speed data bus 310 and control/status bus 312. In one embodiment, controller 303 monitors traffic from electrical side as well as optical side, and is able to adjust bandwidth and/or speed of one side (i.e. electrical side) to compensate the another side. A function of controller 303 is to smooth conversion and synchronize the data throughput. Controllers 308 and 303 may be integrated in a single component.

Security block 306 is coupled to HSE interface 302 and is configured to prevent unauthorized access from the optical network. Security block 306, in one embodiment, monitors traffic passing through HSE interface 302 and is able to stop device access if unauthorized access is detected. The unauthorized access includes hacking activities, computer virus, malware, and the like. Security block 306, in one aspect, is capable of authorizing device access based on user's authentication. Security block 306 may also be integrated into controller 303 and/or 308

Conversion component 303 is able to convert electrical signals received from PON interface 216 and subsequently forwards these electrical signals to HSE interface 302. Similarly, electrical signals received from HSE interface 302 are subsequently forwarded to PON interface 216. In one embodiment, conversion component 303 includes a controller used to provide data management and Ethernet control relating to optical data and electrical data. To manage flow of data between HSE interface 302 and PON interface 216, conversion component 303 may provide adjustments to synchronize transmission rate between the PON and HSE interfaces 216 and 304. It should be noted that ten (10) gigabit media independent interface ("XGMII") protocol may be used to facilitate communication between PON interface 216 and high-speed PC interface 304.

HPC 206 or PON to high-speed interface converter starts with physical layer interface to broadband fiber network, which can be in the form of a pluggable optical-electrical module that converts electrical Ethernet data signals to optical signals formatted for the broadband network. Similarly, upon receiving optical signals from the PON network, the optical signals are converted to electrical signals. The PON network is a point-to-multipoint topology such as 10GEPON, XGPON, WDM (Wavelength Division Multiplexing) PON, OFDMA (Orthogonal Frequency-Division Multiple Access) PON, GPON, or some other passive optical network topology which supports user data speeds in excess of one (1) gigabit.

According to Time Division Multiplexed (BPON, GPON, etc. . . . ), each ONT is assigned a time slot for an allotment of upstream bandwidth while sharing a common wavelength and fiber path. For Wavelength Division Multiplexed (WDM PON), each ONT is assigned a separate wavelength while sharing a common fiber path. For Orthogonal Frequency Division Multiplexed (WIFI over fiber), TDM and/or Frequency Division Multiplexing may be used to distribute available data bandwidth over a common radio frequency spectrum, wavelength, and fiber path. In one example, an ONT can be dynamically assigned a specific time slot and range of RF channels to transmit data over the network.

Power controller 316, in one embodiment, provides power distribution and/or management. Upon plugged in with a host or UE, power is drawn from the host as a power supply. Depending on the PON module used, the power requirement for PON interface 216 may be different from the power supply from the host. Accordingly, power controller 316 adjusts voltage and/or power required by the PON module.

An advantage of employing HPC 206 is that it provides a conversion from the PON signaling that occurs over the optical fiber to a high-speed interface signaling that occurs over the electrical (copper) connection to the PC.

In one embodiment, a PON module, which is the front end of HPC 206, provides a fiber interface to a PON network. The PON module, not shown in FIG. 3, is removably pluggable to PON interface 216, and able to handle optical network services, such as Ethernet and voice/video in a digital format, at a specific downstream wavelength. The PON module converts optical signals to electrical signals which subsequently are fed a PON Media Access Controller ("MAC"). The PON MAC, in one example, is responsible for the low level handshaking that is required to establish a connection with a point-to-multipoint PON network, as oppose to traditional point-to-point fiber Ethernet networks in which data is transmitted in its native format for both directions with simple conversion.

It should be noted that a PON network uses a special encapsulation method such as GPON encapsulation where user service is packaged in a cell for transport over the PON network. The GPON packets, which are also known as GEM packets, not only can carry Ethernet related data formats, but also can transmit TDM, ATM, and/or other data formats. A GPON MAC at the OLT side converts the user services to GEM packets, and transmits the packets to the PON module via the PON network. Upon receiving the GEM packets, the PON module unpacks the GEM packets to recover the services back to their native formats before delivering them to the user.

Once the PON module has extracted the Ethernet service from the PON connection, the Ethernet data is forwarded to the Ethernet MAC in HPC 206. The PON module, as a network access device, can also be remotely configured and administered by the OLT to enable or disable user services. The PON module can further be configured to establish a path or channel for providing network services upon verifying user's authenticity.

Once the Ethernet service is made available to the user by the PON module, the data or packets can be sent electrically to the Ethernet MAC component and Network controller in HPC 206 which subsequently negotiates Ethernet communication with the UE. Note that the electrical connection between the PON module and Ethernet MAC may be established by a standardized interface, such as SGMII, XGMII, or the like. In one aspect, the Ethernet MAC includes a network controller used to manage the connection and communication with the PON module.

Alternatively, the UE is used to control the PON module via control lines 312 by selecting one of multiple user selectable settings for the network connection. Once the Ethernet signaling is prepared by the Ethernet MAC, the signals or data can be filtered or blocked by the security block in accordance with user's authenticity. Security block is used to limit user access to the network as well as limiting network to access UE based on authorities and priorities. The filtered data is then electrically fed to a UE via a high-speed PC interface such as USB 3.0, Thunderbolt™ or the like. The high-speed PC interface, in one example, also provides a power connection between the UE and HPC 206 via a predefined cable and/or connector(s). Note that the predefined cable or connector can be commercially available standardized format, such as USB 3.0 connector, Thunderbolt™ connector, and the like.

For data packets traveling in upstream direction, the process is similar as downstream direction except certain orders are reversed. For example, the user data is sent across a high-speed interface to the Ethernet MAC, and the data is subsequently processed and forwarded to PON interface 216. Upon reaching PON interface 216, the PON module forwards the data via a PON network via a predefined timeslot negotiated with the OLT. Since the PON network is a point-to-multipoint shared connection, other HPCs and ONTs can simultaneously connect to the same fiber path or optical fiber. To prevent collision and/or interference, every shared network device such as HPC or ONT is assigned a timeslot for transferring upstream data in form of optical bursts including cells or GEM packets.

Figure 4:
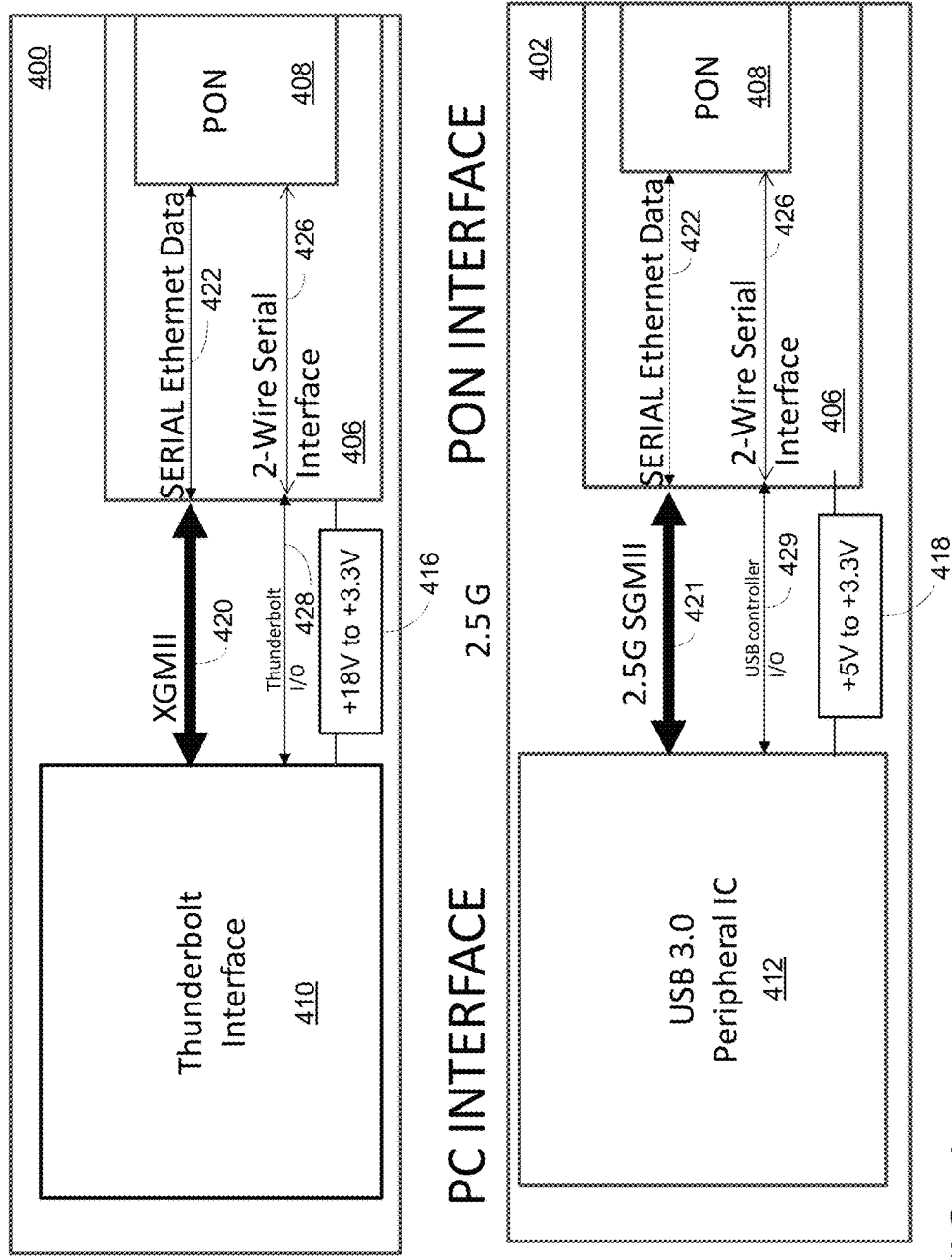
FIG. 4 illustrates an HPC with Thunderbolt™ interface and HPC with USB 3.0 interface in accordance with one embodiment of the present invention.

FIG. 4 illustrates HPC 400 with Thunderbolt™ interface and HPC 402 with USB 3.0 interface in accordance with one embodiment of the present invention. HPC 400 includes a Thunderbolt™ interface 410, data bus 420, and PON interface 406 wherein PON interface 406 includes a socket housing a PON module 408. In one embodiment, data bus 420 is capable of operating ten (10) gigabit bandwidth using 10 gigabit media independent interface ("XGMII"). Upon data conversion at PON module 408, PON interface 406 transmits serial Ethernet data 422 from PON module 408 to Thunderbolt™ interface 410 using high-speed data bus 420. Similarly, upon receipt of serial Ethernet data from bus 420, PON interface 406 forwards serial Ethernet data 422 to PON module 408. The serial Ethernet data is converted to optical data before it is transmitted to its destination via an optional network. Bus 428, in one embodiment, is used to transmit control and/or status information between Thunderbolt™ interface and PON interface 406. In one embodiment, bus 428 is coupled with a 2-wire serial interface 426 in PON interface 406.

Power controller unit 416, in one embodiment, provides power distribution and/or management. Upon plugged in with UE, power is drawn from the UE as a power source. Depending on power requirement of PON module 408, unit 416 adjusts voltage between +18 volts ("v") and +3.3 v based on power requirement of PON module 408.

HPC 402, which is similar to HPC 400, includes a USB 3.0 interface 412, data bus 421, and PON interface 406 wherein PON interface 406 includes a socket housing a PON module 408. In one embodiment, data bus 421 is capable of operating 2.5 gigabit bandwidth using serial gigabit media independent interface ("SGMII") or 2.5G SGMII. Upon data conversion at PON module 408, PON interface 406 transmits serial Ethernet data 422 from PON module 408 to USB 3.0 interface 412 using high-speed data bus 421. Similarly, upon receipt of serial Ethernet data from bus 421, PON interface 406 forwards serial Ethernet data 421 to PON module 408 for conversion before data 422 is transmitted to its destination via an optional network. Bus 429, in one embodiment, is used to transmit control and/or status information between USB 3.0 interface and PON interface 406. In one embodiment, bus 429 is coupled with a 2-wire serial interface 426 in PON interface 406.

USB 3.0 is a universal serial bus standard for connectivity. In one example, USB 3.0 is capable of transferring data anywhere from 2 gigabit per second ("Gbit/s") to 5 Gbit/s. It should be noted that using USB 3.0, Thunderbolt™, XGMII, SGMII, and 2-Wire serial interface are for illustration purposes. The underlying concept of the exemplary embodiment(s) of the present invention would not change if one or more of USB 3.0, Thunderbolt™, XGMII, SGMII, and/or 2-Wire serial interface are replaced with other similar type(s) of protocols, formats, and/or standards.

In one aspect, PON module 408 can be plugged into a standardized socket. For example, module 408 can be SFP, SFP+, or XFP optical modules. Note that XFP refers to a 10 Gigabit Small Form Factor Pluggable socket or module. The socket, which is in PON interface 406, provides an electrical connection to the high-speed interface such as Thunderbolt™ or USB 3.0. The high-speed interface module controls and/or monitors the PON module 408, and provides a high-speed data connection to the user's personal computer. The high-speed interface such as Thunderbolt™ interface 410 can be any types of high-speed PC interfaces.

Alternatively, the high-speed interface can be an integrated PC interface such as PCIe Bus or PCIe Card (i.e., MXM). A Mobile PCI Express Module ("MXM"), for instance, supports electrical data speeds in excess of 10 Gbps. To prevent malicious access to the user's PC or UE over the network, a security function could be incorporated into the high-speed interface controller to limit the PC memory access to only the space designated for network data traffic by the PC driver. The security function can also limit user access to the PON network.

Power controller unit 418, in one embodiment, provides power distribution and/or management. Upon being plugged in with UE, power is drawn from the UE as a power source. Depending on power requirement of PON module 408, unit 418 adjusts voltage between +5 volts ("v") and +3.3 v based on power requirement of PON module 408.

The high-speed interface module such as Thunderbolt™ interface 410 employs low-speed 2-wire bus such as I2C (I-squared-C) to control and/or monitor the optical to electrical interface module 408. To prevent malicious access to the user's PC over the network and/or optical network, a security function can be incorporated into the high-speed interface controller to limit the PC memory access. Depending on the applications, the security function can provide limitations to certain memory or space designated for network traffic with certain types of authentication. Alternatively, the PON interface and high-speed PC interface can be integrated into a single pluggable device.

Figure 5:
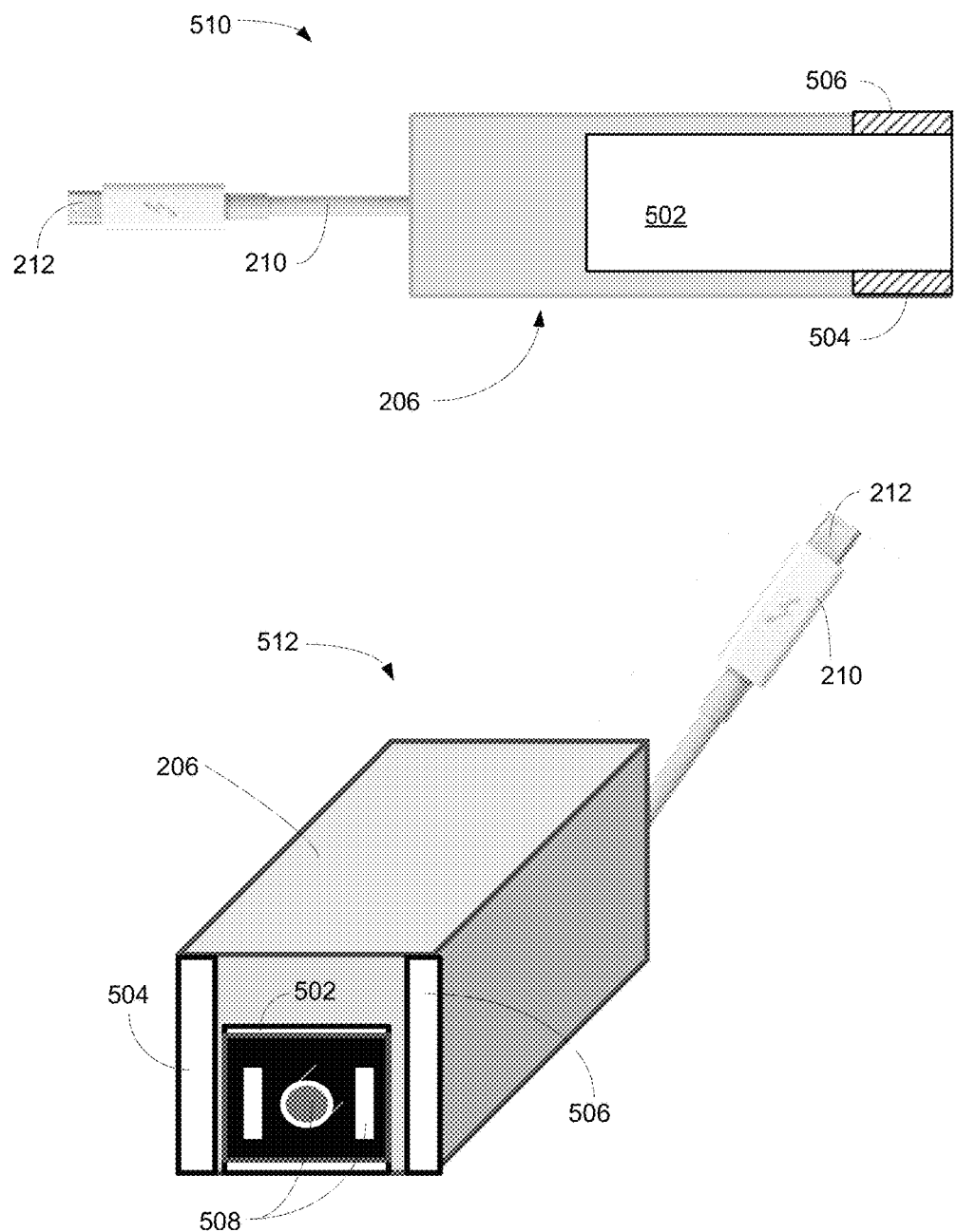
FIG. 5 illustrates exemplary physical arrangements or form factors of HPC in accordance with one embodiment of the present invention.

FIG. 5 illustrates exemplary physical arrangements or form factors of HPC in accordance with one embodiment of the present invention. Diagram 510 illustrates a cross-section view of HPC 206 containing an electrical cable 210, status indicators 504-506, and housing 502. Housing 502, also known as an optical module socket, is used to house a PON module including PON related components such as PON MAC. In one aspect, status indicator 504, which is capable of emitting visible illumination, may be used to indicate PC connection status. Status indicator 506, which is also capable of illuminating, may be designated to show network connection status. Diagram 512, which is similar to diagram 510, illustrates similar components of HPC 206 in a three-dimensional (3D) diagram. HPC 206, shown in diagram 512, contains a PON module that is inserted or plugged in the socket or housing 502. The PON module includes standard optical fiber connector 508 capable of coupling to a fiber.

In one embodiment, HPC 206 includes a PON to PC interface, hot pluggable high-speed PC interface, hot pluggable PON interface, status indication of PC connection, and status indication of network connection. HPC 206 draws power from the attached or connected user's PC or UE. Note that the data transmission rate for the PON to PC interface is at least one (1) Gbps. A security manager or function in HPC 206 can be configured to limit user access to the PON network as well as limiting network access to user's PC or UE.

The PON module, in one example, incorporates a built-in PON controller such as a GPON, XGPON MAC, or the like. Note that the PON module can be a separate pluggable interface. Alternatively, the PON module can also be an integral part of the conversion apparatus that connects to the PC. The design and shape of coupling or plugging connectors for PON modules can be configured to comply with standards, such as SFP, SFP+ or XFP.

The PC interface can be structured in various available pluggable standards, such as USB 3.0, SuperSpeed USB, Thunderbolt™, or integrated options such as PCIe Bus or PCIe Slot (MXM). The PC interface can be integrated into user's PC or UE in any format, such as desktop, notebook, SmartTV, or gaming system, or other intelligent device requiring high-speed network access. The status indication, in one example, can be an illuminated fiber cable connecting to the network as well as device performance.

Figure 6:
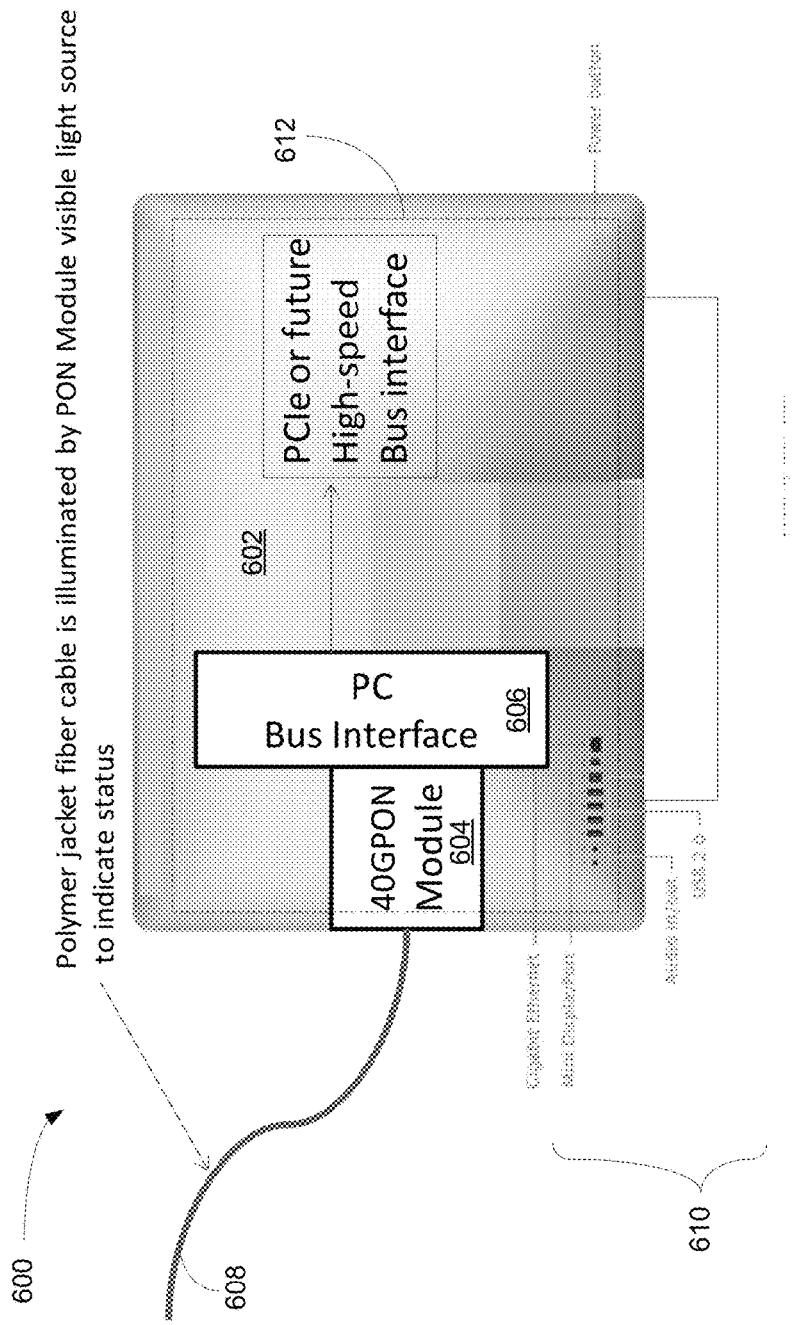
FIG. 6 is a diagram illustrating an exemplary HPC module installed in a PC or UE able to facilitate data flow via optical network in accordance with one embodiment of the present invention.

FIG. 6 is a diagram 600 illustrating an exemplary PON HPC module installed in a PC or UE able to facilitate direct data flow via an optical network in accordance with one embodiment of the present invention. Diagram 600 includes a PC or UE 602 and a polymer jacket fiber cable 608. Polymer jacket fiber cable 608, in one example, is able to illuminate visible light to indicate status relating to PON module as well as data transmission. It should be noted that the underlying concept of the exemplary embodiment(s) of the present invention would not change if one or more blocks (or elements or connections) were added to or removed from diagram 600.

PC 602, in one embodiment, includes a PON socket 604, PC bus interface 606, and display 612. PON socket 604 is configured to receive a PON module and PC bus interface 606 is configured to communicate with PC 602. PC bus interface 606 uses high-speed bus interface such as PCIe. PON socket 604, in one example, is removable from PC 602 whereby different PON socket(s) may be used for different PON modules. It should be noted that different PON modules may have different connection and/or coupling requirements. Display 612 displays information of PC 602. PC 602 also includes various input and output ("I/O") ports 610, such as gigabit Ethernet port, Mini-display port, audio I/O port, USB 2.0, firewire port, and so forth. These additional interfaces are not required for the HPC.

The PON interface and high-speed PC interface, in one embodiment, is integrated into a single pluggable device. For instance, the high-speed PC interface can be integrated into PC 602. Note that PC can be a desktop tower, laptop, notebook, tablet, SmartTV, gaming console or future device that requires high-speed network access.

To interface with PC 602, the broadband to high-speed interface converter requires a software driver to communicate with operating system ("OS") of the PC or UE. The OS of PC can handle low level signaling processing which is required to support high-speed interface. The driver, for instance, provides physical layer status indicating connection between the broadband interface and converter.

The software driver or module for the PON to PC converter performs critical functions to support the converter. For example, the driver establishes communication between OS, PC interface, and PON interface, and manages connections between the network and the PC. Upon obtaining status of PC and PON interfaces, the status is forwarded to the OS as well as other applications such as user software. The software driver may be further used to enable user management of selectable settings with respect to the PON network, and read status from the PC and PON interfaces. The driver also controls visible and audible status indications on the converter and generates alarms based on the converter status. The alarms include, but are not limited to, "network error", "Loss of Signal", "cable disconnect", "overcurrent", and the like.

In addition, the PON to PC converter also provides some visible or audible status indicating PC and PON interfaces, such as power, PON connection status, data connection status, and alarm or error conditions. The visible status indication, in one example, is in the form of an illuminated polymer jacket on a fiber cable.

Figure 7:
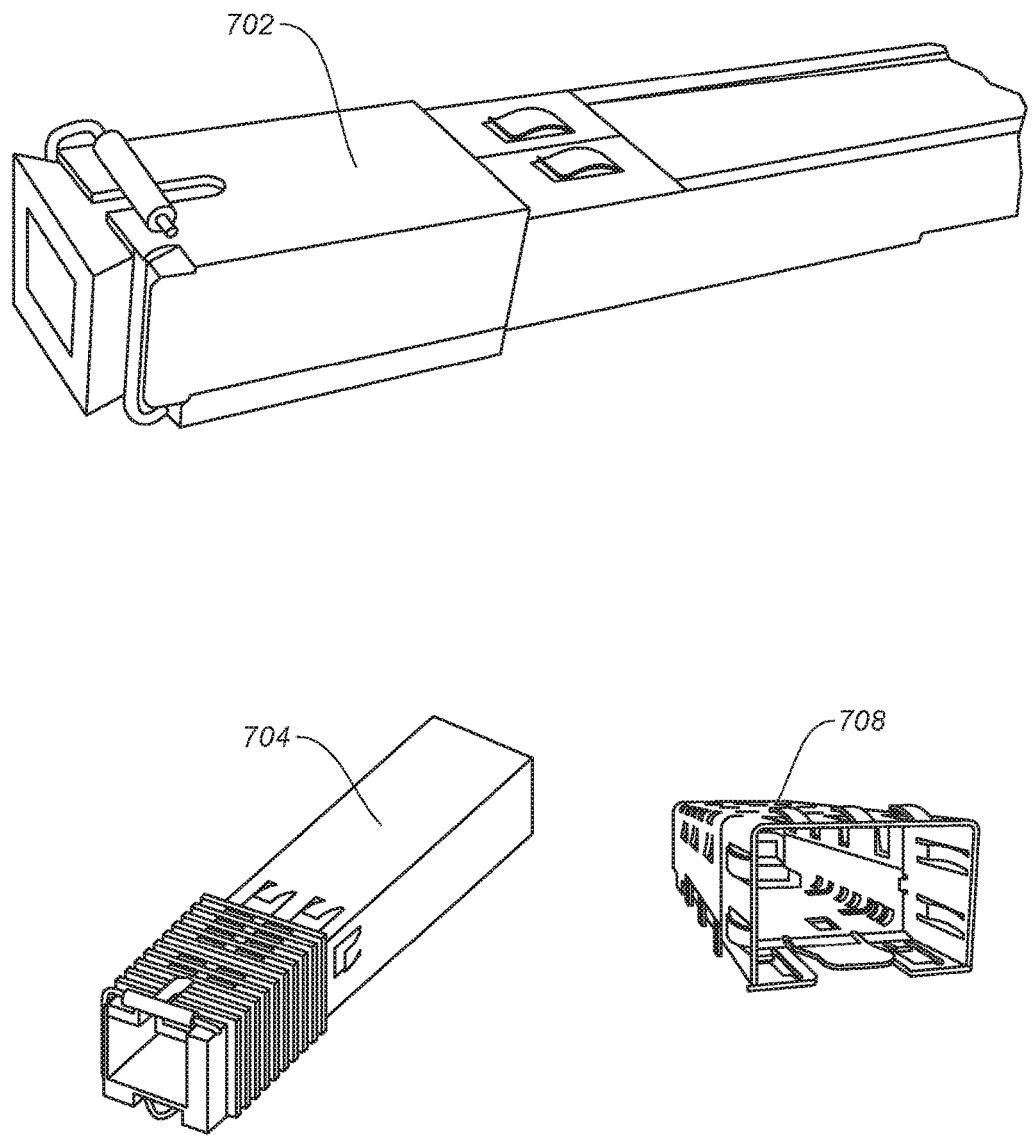
FIG. 7 illustrates exemplary form factors or physical arrangements of pluggable optical modules and pluggable module socket that can be used with HPC in accordance with one embodiment of the present invention.

FIG. 7 illustrates exemplary form factors or physical arrangements of pluggable optical modules 702-704 and pluggable module socket 708 that can be used with HPC in accordance with one embodiment of the present invention. Pluggable optical module 702, which is a SFP with Gigabit-capable PON module or standard Gigabit PON module, can be inserted or plugged into a module socket of an UE or PC. In one embodiment, module 702 includes HPC allowing UE to directly couple to an optical network. Pluggable optical module 704, which is similar to module 702, is a slightly different configuration of SFP for a PON module, such as an XFP 10 Gigabit module or SFP+10 Gigabit module, that contains HPC functions. Pluggable module socket 708 shows a mechanical mounting platform for housing an optical module. In one aspect, socket 708 can be removably installed in PC or UE.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 8:
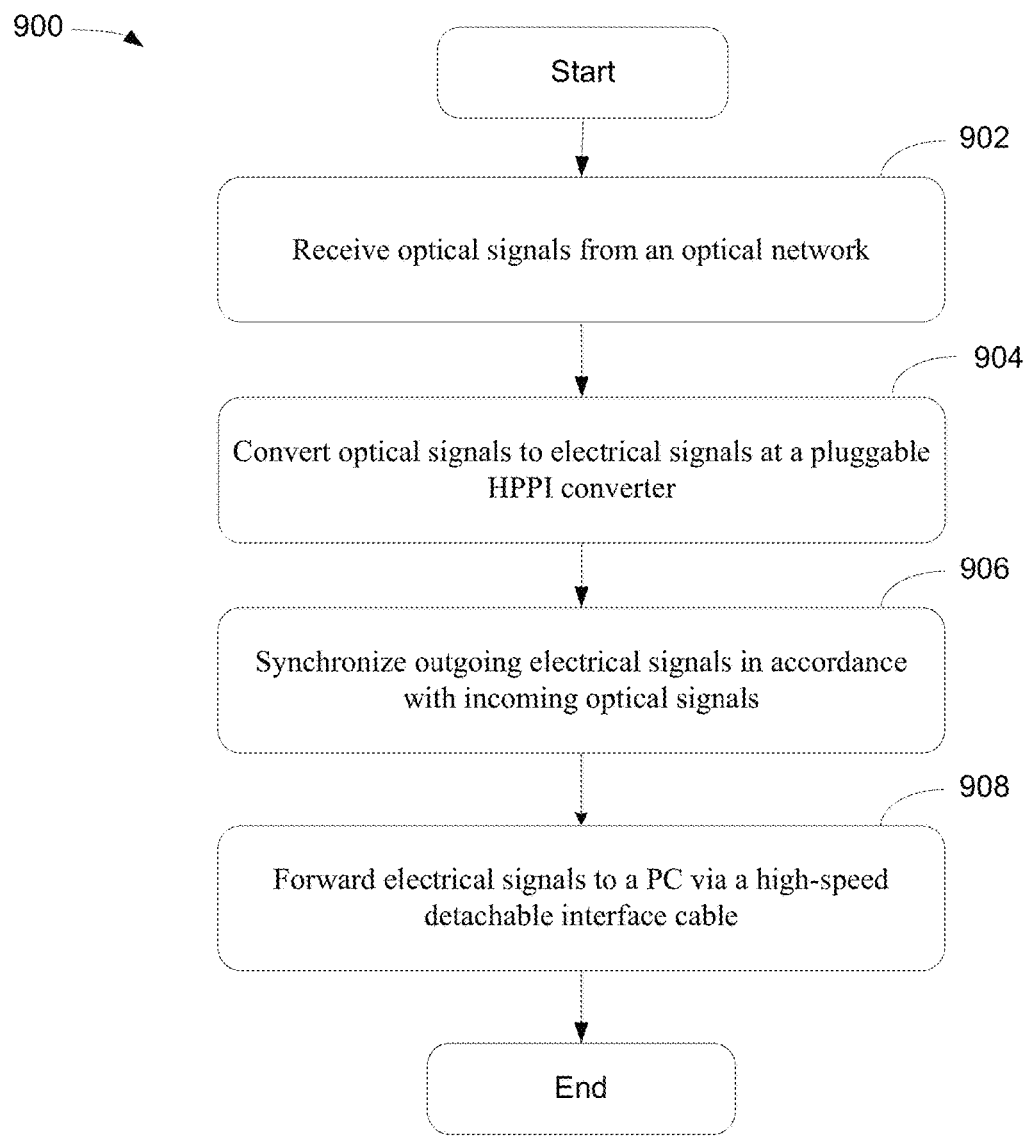
FIG. 8 is a flowchart illustrating a data conversion process using a high-speed PON converter in accordance with one embodiment of the present invention.

FIG. 8 is a flowchart 900 illustrating a data conversion process using a high-speed PON converter in accordance with one embodiment of the present invention. At block 902, a process of data transmission receives optical signals from a Passive optical network through an optical fiber connected between a fiber splitter and a PON module. Upon inserting the PON module into an optical module socket in HPC, the high-speed detachable interface cable is plugged into a Thunderbolt™ port located at UE. In one embodiment, HPC or pluggable high-speed PON to PC interface ("HPPI") converter is capable of drawing electricity or power from the PC to the HPPI converter via the high-speed detachable interface cable. After verifying and/or communicating with UE, the HPPI converter is activated.

At block 904, the process converts optical signals to electrical signals at a pluggable HPPI converter. The process is also capable of converting electrical data to optical data using the pluggable HPPI converter or HPC.

At block 906, user data is extracted from the PON signals. At block 908, the process forwards electrical signals to a PC via a high-speed detachable interface cable. The communication or data is monitored by a security block at the HPPI converter to prevent unauthorized data access. It should be noted that high-speed detachable interface cable can be replaced with a high-speed wireless connection.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A signal conversion interface device comprising:
    a passive optical network ("PON") interface configured to couple to an optical network via an optical fiber and able to receive optical information from the optical fiber;
    a high-speed electrical ("HSE") interface, having a Thunderbolt™ plug, coupled to the PON interface and configured to be pluggable to a personal computer ("PC") via the Thunderbolt™ plug for transferring data between the PON interface and the HSE interface, wherein the Thunderbolt™ plug is able to obtain power from the PC for device operation;
    a conversion component coupled to the PON interface and able to obtain an optical transmission timeslot from a point-to-multipoint PON network for facilitating a bidirectional communication between the PON interface and the HSE interface; and
    a controller coupled to the HSE interface and configured to provide data management and Ethernet control relating to the PON interface.

2. The device of claim 1, further comprising a security block coupled to the HSE interface and configured to prevent unauthorized access from the optical network.

3. The device of claim 1, wherein the PON interface includes an optical module socket configured to house a PON module.

4. The device of claim 3, wherein a conversion component is able to negotiate with an optical line terminal ("OLT") of the point-to-multipoint PON network to allocate a timeslot within a point-to-multipoint fiber for optical data transmission.

5. The device of claim 1, wherein the HSE interface is able to implement Thunderbolt™ connectivity and able to communicate with the PC via a Thunderbolt™ cable.

6. The device of claim 1, wherein the HSE interface is able to implement Universal Serial Bus ("USB") 3.0 protocol and able to communicate with the PC via a pluggable USB 3.0 cable connector.

7. The device of claim 1, wherein a conversion component sends and receives electrical data signals between the PON interface and the HSE interface.

8. The device of claim 7, wherein a conversion component is configured to synchronizing data formats between data stream handled at the PON interface and data stream handled at the HSE interface.

9. The device of claim 8, wherein a conversion component employs 10 gigabit media independent interface ("XGMII") protocol to facilitate communication between the PON interface and the HSE interface.

10. A network configuration, comprising:
    a passive optical network ("PON") network having at least one fiber splitter and one optical line terminal ("OLT"), and configured to transmit optical data;
    a personal computer ("PC") having a high-speed electrical ("HSE") port and able to process information based on electrical signals received from the HSE port;
    an interface converter ("IC") device having a Universal Serial Bus ("USB") interface and an optical fiber, wherein the USB interface is removably plugged into the HSE port and the optical fiber is detachably coupled to the fiber splitter, wherein the IC device is able to facilitate communication between the PON network and the PC, wherein the USB interface is capable of drawing power from the HSE port as power source for the IC device; and a security block coupled to the HSE port and configured to prevent unauthorized access from the PON network.

11. The configuration of claim 10, wherein the PON network is a point-to-multipoint and a fiber to multiple premises network able to transmit information across a distance.

12. The configuration of claim 11, wherein the HSE port further includes a Thunderbolt™ port able to process information at a high-speed.

13. The configuration of claim 11, wherein the HSE port is a Universal Serial Bus ("USB") 3.0 port able to process information at a high-speed.

14. The configuration of claim 11, wherein the IC device is able to obtain power from the PC when it is plugged into the HSE port.

15. The configuration of claim 14, wherein the IC device includes,
a PON interface able to receive optical information from the optical fiber;
an HSE interface configured to be pluggable to a port via a predefined removable connector; and
a conversion component coupled to the PON interface and able to transmit information between the HSE interface and the PON interface.

16. A method for data transmission comprising:
plugging a Universal Serial Bus ("USB") plug of a high-speed PON to personal computer ("PC") interface ("HPPI") converter into a USB port of a PC for obtaining power from the PC as power source for the HPPI converter;
receiving optical signals from a point-to-multipoint optical network through an optical fiber connected between a fiber splitter and a passive optical network ("PON") module;
converting the optical signals to electrical signals at the HPPI converter;
facilitating a negotiation of PON protocol initiated by the PON module and a negotiation of UE interface protocol;
forwarding electrical signals to a PC via a high-speed detachable interface cable;
inserting the PON module into an optical module socket in the HPPI converter;
activating the HPPI converter; and
monitoring communication by a security block at the HPPI converter to prevent unauthorized communications.

17. The method of claim 16, wherein forwarding electrical signals to a PC includes transmitting electrical signals to a user equipment that enables wireless communication.

* * * * *